United States Patent [19]
Steiner et al.

[11] Patent Number: 6,077,446
[45] Date of Patent: Jun. 20, 2000

[54] SAND FILTRATION FILTERING SYSTEM USING OZONE

[75] Inventors: Carl A. Steiner, Erie; Ricky L. Jackson, Union City; Kenneth W. Giebel, Enon Valley, all of Pa.

[73] Assignee: TM Industrial Supply, Inc., Erie, Pa.

[21] Appl. No.: 09/052,595

[22] Filed: Mar. 31, 1998

Related U.S. Application Data

[60] Provisional application No. 60/042,250, Mar. 31, 1997.

[51] Int. Cl.$^7$ ..................................................... C02F 1/78
[52] U.S. Cl. .......................... 210/760; 210/765; 210/792; 210/192; 210/195.1; 210/206
[58] Field of Search ..................................... 210/760, 765, 210/792–796, 192, 195.1, 203, 205–208, 218, 220

[56] References Cited

U.S. PATENT DOCUMENTS

| | | | |
|---|---|---|---|
| 2,355,564 | 8/1944 | Sebald | 210/16 |
| 4,053,403 | 10/1977 | Bachhofer et al. | 210/760 |
| 4,104,166 | 8/1978 | LaRaus | 210/195 R |
| 4,330,401 | 5/1982 | Boze et al. | 210/106 |
| 4,443,341 | 4/1984 | Miller et al. | 210/702 |
| 4,707,252 | 11/1987 | Durot et al. | 210/151 |
| 4,798,669 | 1/1989 | Bachhofer et al. | 210/760 |
| 5,147,530 | 9/1992 | Chandler et al. | 210/90 |
| 5,173,194 | 12/1992 | Hering, Jr. | 210/792 |
| 5,174,905 | 12/1992 | Shaw | 210/760 |
| 5,277,829 | 1/1994 | Ward | 210/792 |
| 5,494,576 | 2/1996 | Hoppe et al. | 210/198.1 |
| 5,512,178 | 4/1996 | Dempo | 210/638 |
| 5,514,282 | 5/1996 | Hibbard et al. | 210/652 |
| 5,514,284 | 5/1996 | Uban et al. | 210/760 |
| 5,520,804 | 5/1996 | Ward | 210/189 |
| 5,543,037 | 8/1996 | Hering, Jr. | 210/104 |

*Primary Examiner*—Thomas G. Wyse
*Attorney, Agent, or Firm*—Webb Ziesenheim Logsdon Orkin & Hanson, P.C.

[57] ABSTRACT

A device for filtering and disinfecting a fluid, such as waste water, is provided. The device includes a housing having an interior and a fluid inlet conduit in flow communication with the interior of the housing. An ozone source is in flow communication with the interior of the housing. Additionally, a method of filtering and disinfecting a fluid is provided. Filter media is introduced into a housing to form a filter bed. The fluid to be filtered is directed into the housing such that the fluid flows through the filter media to form a filtrate. Ozone is directed into the housing such that the ozone contacts and disinfects the filter media and the filtrate.

21 Claims, 3 Drawing Sheets

SAND FILTRATION FILTERING SYSTEM USING OZONE

CROSS REFERENCE TO RELATED APPLICATION

This application claims the benefit of United States Provisional Application Ser. No. 60/042,250 filed on Mar. 31, 1997 and entitled "Sand Filtration Filtering System Using Ozone".

BACKGROUND OF THE INVENTION

1. Field of the Invention

The invention relates generally to filtering devices for filtering suspended solids from a liquid stream and, more particularly, to a filtering device and method using ozone to disinfect both the liquid stream and the filtering media.

2. Description of the Prior Art

In order to conserve water, many industrial facilities recycle and reuse waste water or turbid water streams. However, before such water can be reused, debris in the stream must be removed so that it does not damage equipment. Various filtration devices are known for removing debris from a waste water stream or turbid water stream to clarify the water prior to its use in, for example, manufacturing and industrial facilities, such as power plants, as well as municipal facilities, such as conventional potable water systems. These known filtration devices include conventional "deep bed sand filters". One such deep bed sand filter is disclosed in U.S. Pat. No. 5,277,829 to Ward. In conventional deep bed sand filters such as described in the Ward patent, a downwardly flowing filter media, for instance sand, is placed in counterflow to the upwardly flowing waste water stream. Debris is removed from the waste stream by being trapped in the downwardly flowing sand. Although such deep bed sand filters generally do a good job of removing relatively large debris material from the waste stream, there are problems associated with these known deep bed sand filters.

For example, while the filter media, usually a sand bed, removes relatively large particulate debris from the waste stream, the filter media has little or no effect upon biological contaminants, such as bacteria, or upon small organic material. Therefore, the effluent from these conventional deep bed sand filters must be further purified downstream of the sand filter to try to remove the biological and organic contaminants. The need for such downstream purification systems increases the costs of manufacturing and maintaining the filtration system as well as the time required to complete the treatment of the waste stream. Due to the presence of bacteria and organic matter in the waste stream, these conventional deep bed sand filters rapidly become bacteria and organic growth havens, leading to a foul odor which is unpleasant to work around. Also, organic growth in the filter media contaminates the filter media and hinders the filtering ability of the filter media. Therefore, the sand bed in these conventional deep bed sand filters must be frequently replaced. This frequent removal and replacement of the sand bed is time consuming and increases the operational costs of the filtering device. Additionally, the size of the particulate matter in the waste stream which can be removed by conventional deep bed sand filters is dependent upon the type of filtering media used. With conventional deep bed sand filters, very small debris, such as small organic material, may escape being trapped in the sand bed altogether.

Therefore, it is an object of the invention to provide a device for filtering particulate material from a fluid stream, such as waste water, which also disinfects the filter media and the fluid being treated to help prevent bacterial and organic growth in the device and the foul odors and decreased filtering capacity associated therewith. It is additionally an object of the invention to provide a filtering device in which relatively small organic debris may be oxidized to help remove such small organic debris from the waste stream. It is also an object of the invention to provide a filtering device in which additional bacterial purification is not needed downstream of the filtering device. It is further an object of the invention to provide a filtering device which cleans and disinfects a fluid stream at decreased media and maintenance costs.

SUMMARY OF THE INVENTION

A device for filtering and disinfecting a fluid, such as waste water, is provided. The device includes a housing defining an interior adapted to hold a filter media in a first portion of the housing. A fluid inlet conduit is in flow communication with the interior of the housing. An ozone distributor is in flow communication with the interior of the housing and is positioned in the first portion of the housing.

Additionally, a method of filtering and disinfecting a fluid is provided. Filter media is introduced into a housing to form a filter bed. The fluid to be filtered is directed into the housing such that the fluid flows through the filter media to form a filtrate. Ozone is directed into the housing such that the ozone contacts and disinfects the filter media and the filtrate.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
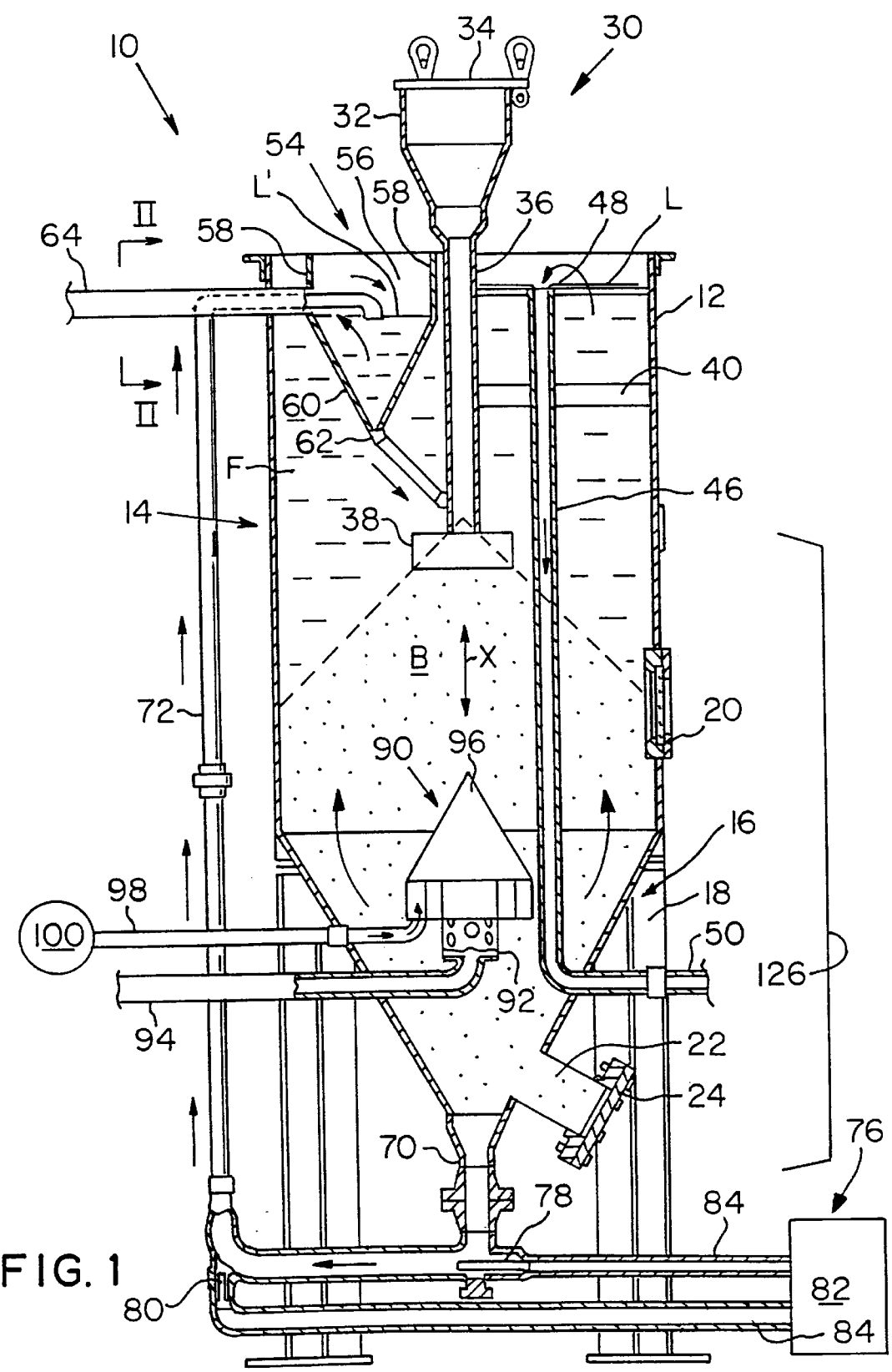
FIG. 1 is a side, partially in section view of a filtering device of the invention.

For purposes of the description hereinafter, the terms "upper", "lower", "right", "left", "rear", "front", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 3:
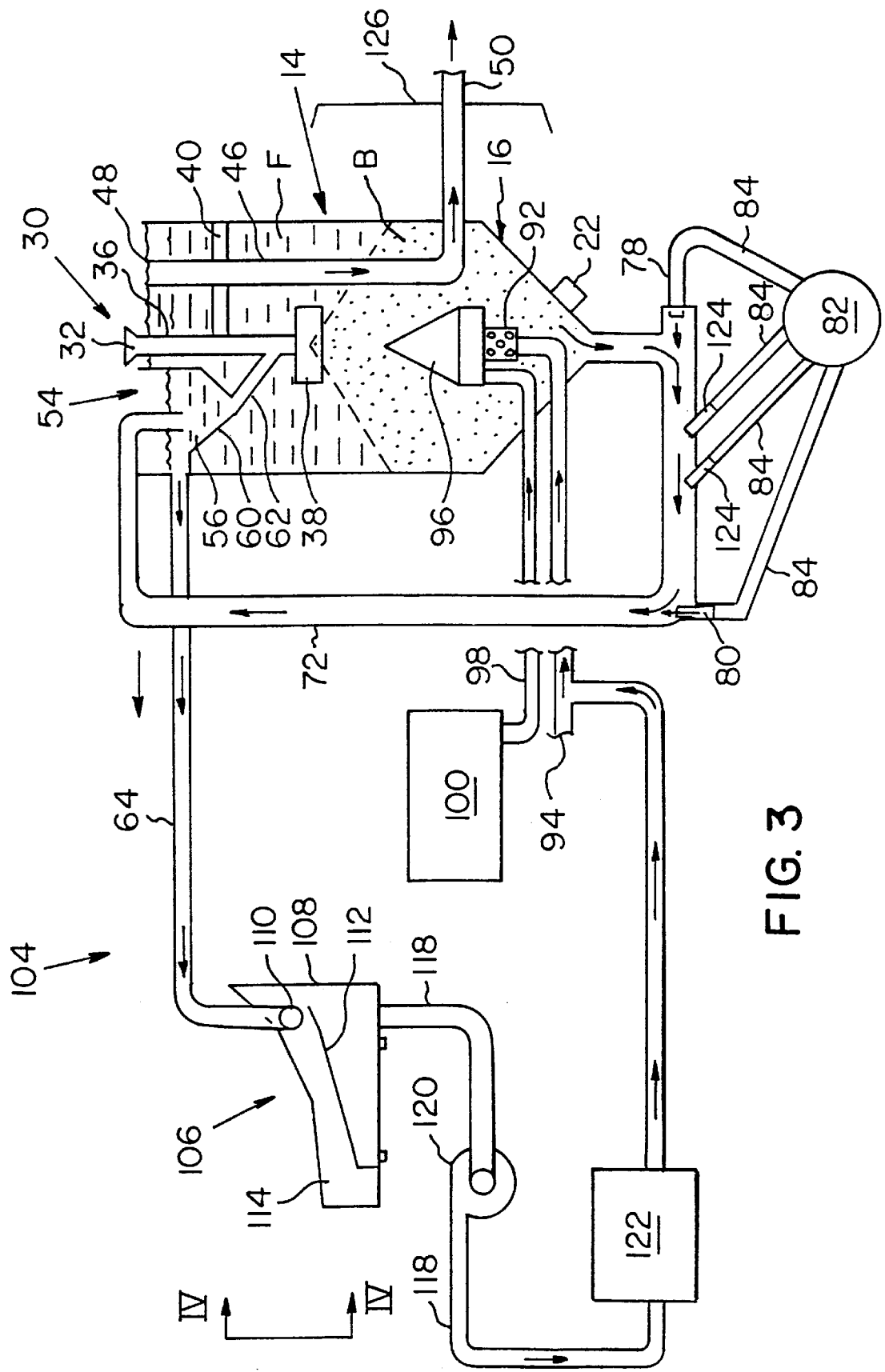
FIG. 3 is a schematic view of a second embodiment of the filtering device having a secondary waste filtration system.

A filtering device of the invention is generally designated 10 in FIGS. 1 and 3 of the drawings. As shown in FIG. 1 of the drawings, the filtering device 10 includes an elongated, hollow housing 12 having a substantially cylindrical upper portion 14 and a conically tapered lower portion 16. The housing 12 is preferably made of metal, such as steel or aluminum. The housing 12 is supported on a plurality of, for example, four (of which only two are shown), legs 18 to maintain the housing 12 in a substantially vertical or upright position. A sight glass 20 is formed in the side wall of the upper portion 14 of the housing 12 and a media removal conduit 22 extends from the lower portion 16 of the housing 12. The media removal conduit 22 has a removable cover 24.

A filter media addition device 30 extends into the top of the housing 12 and is in flow communication with the interior of the housing 12. The media addition device 30 includes a hopper 32 having a removable cover 34. A media replenishment conduit 36 extends from the hopper 32 into the interior of the housing 12. A media discharge member 38 is preferably located on the bottom end of the replenishment conduit 36. The media discharge member 38 is preferably formed as a hollow, cylindrical member having an open bottom. Alternatively, the media discharge member 38 can be removed. The media addition device 30 is held in place by a spacer bar 40 attached to the inner surface of the upper portion 14 side wall, for example by welding.

A filtrate conduit 46 is also attached to and held in place by the spacer bar 40. The filtrate conduit 46 has a first or inlet end 48 located inside the housing 12, preferably near the top of the housing 12, and a second or outlet end 50 passing through the tapered lower portion 16 and extending outside the housing 12.

Figure 2:
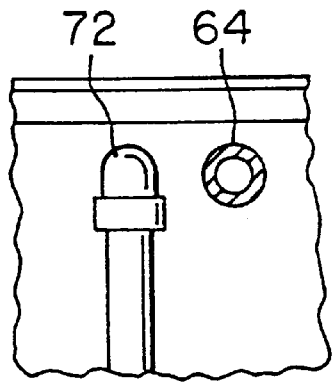
FIG. 2 is a view of the top of the filtering device shown in FIG. 1 in the direction of arrow II—II.

A separator assembly 54 is also located inside the filtering device 10 near the top of the housing 12. The separator assembly 54 includes a separation chamber 56 having an upwardly extending side wall 58 and a tapered bottom 60. A separator conduit 62 extends from the bottom 60 of the separation chamber 56 and is in flow communication with the media replenishment conduit 36 above the discharge member 38. As shown in FIGS. 1 and 2 of the drawings, a waste conduit 64 extends from the separation chamber 56 through the housing side wall near the top of the housing 12. The waste conduit 64 is positioned at a height substantially level with, or preferably, below the height of the inlet end 48 of the filtrate conduit 46.

A discharge conduit 70 extends from, and is in flow communication with, the lower portion 16 of the housing 12. A transfer conduit 72 extends between, and is in flow communication with, the discharge conduit 70 and the interior of the separation chamber 56. As shown in FIG. 2 of the drawings, the transfer conduit 72 is preferably laterally spaced from the waste conduit 64.

A lifting assembly 76 is in flow communication with the transfer conduit 72. Preferably, the lifting assembly includes a first injector nozzle 78 located in the transfer conduit 72 adjacent the discharge conduit 70 and extending substantially perpendicular to a vertical axis X of the filtering device 10 and a second injector nozzle 80 located downstream of the first air injector nozzle 78 and preferably extending substantially parallel to the vertical axis X of the filtering device 10. The injector nozzles 78 and 80 are in flow communication with a pressurized fluid source 82 through injector conduits 84. In the preferred embodiment of the invention, the lifting assembly 76 is a pneumatic device, the injector nozzles 78 and 80 are conventional air injector nozzles and the pressurized source 82 is a source of pressurized air.

A distributor unit 90 is located in the interior of the housing 12, preferably below the level of the media discharge member 38. The distributor unit 90 includes a fluid distributor 92 in flow communication with a fluid inlet conduit 94. The fluid distributor 92 preferably includes a plurality of radially directed distribution ports. The distributor unit 90 further includes an ozone distributor, such as an ozone distribution cone 96, in flow communication with an ozone conduit 98. The ozone conduit 98 is in flow communication with an ozone source 100, such as a conventional ozone generator.

Figure 4:
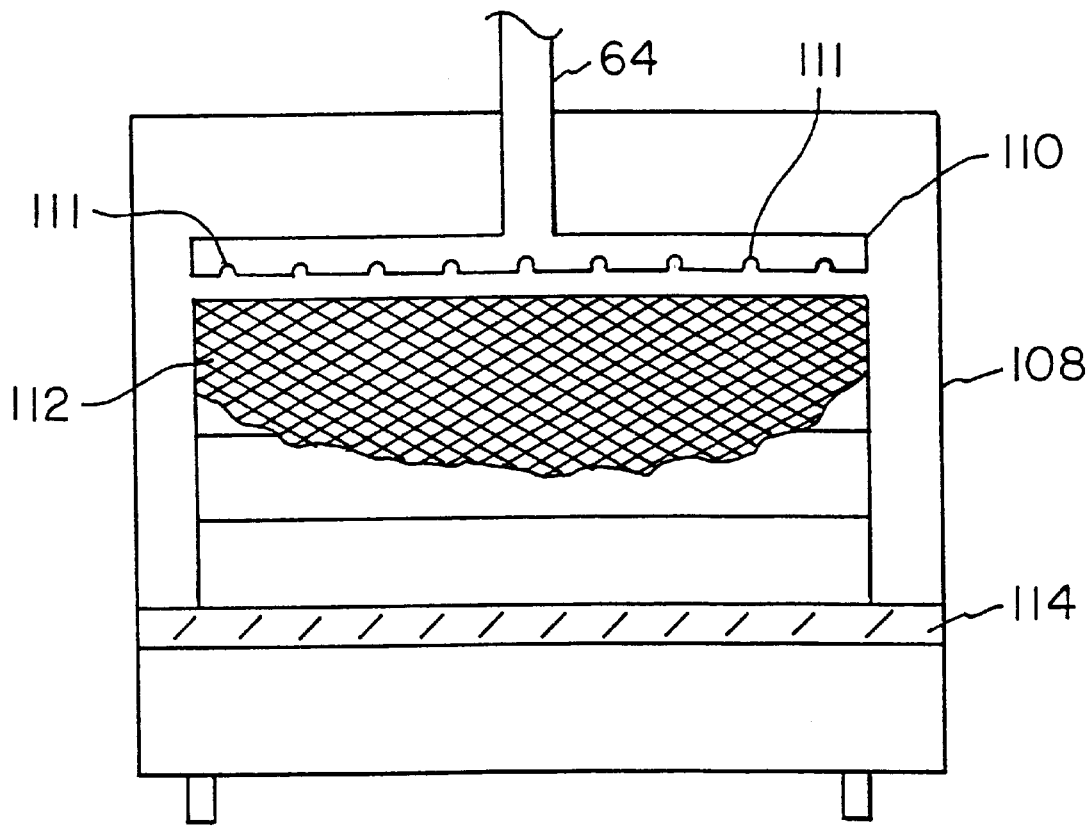
FIG. 4 is a front, partially broken away view of a cascading strainer of the invention in the direction of arrow IV—IV of FIG. 3.

A second embodiment of the filtering device 10 of the invention is shown in FIG. 3 of the drawings. The second embodiment of the invention is similar to the first embodiment described above but further includes a secondary waste filtration system 104. In the second embodiment, the waste conduit 64 extends between, and is in flow communication with, the separation chamber 56 and a strainer assembly 106. As shown in FIGS. 3 and 4 of the drawings, the strainer assembly 106 preferably includes a cascading strainer 108 having a substantially longitudinally extending flow distributor 110 in flow communication with the waste conduit 64. The flow distributor 110 includes a plurality of holes 111 and is located above the upper end of a downwardly sloping separator screen 112. A debris catcher 114 is located adjacent the lower end of the separator screen 112.

A strainer discharge conduit 118 extends between the cascading strainer 108 and the fluid inlet conduit 94. A recycle pump 120 and a secondary filter 122 are in flow communication with the strainer discharge conduit 118. The secondary filter 122 is preferably a conventional bag filter.

In the second embodiment of the filtering device 10 shown in FIG. 3 of the drawings, secondary injector nozzles 124 are located in the transfer conduit 72 between the first injector nozzle 78 and the second injector nozzle 80 and are in flow communication with the pressurized fluid source 82 through additional injector conduits 84. The secondary injector nozzles 124 preferably enter the transfer conduit 72 at an angle, as shown in FIG. 3 of the drawings.

Operation of the filtering device 10 will now be discussed. With respect to FIG. 1 of the drawings, the cover 34 of the hopper 32 is opened and filtering media, such as sand, is poured into the top of the hopper 32. The sand flows through the replenishment conduit 36 and out of the media discharge member 38 to form a sand bed B inside the housing 12. The sand is preferably added until the bottom of the discharge member 38 is below the top of the sand bed B and the top of the sand bed B is at or above the level of the sight glass 20. The cover 34 is then resecured to the top of the hopper 32. The filter media is thus held in a first portion 126 of the housing.

Fluid, such as debris laden waste water, is pumped into the fluid inlet conduit 94, for example by a conventional motor driven pump (not shown), and into the fluid distributor 92. The water flows radially outwardly through the distribution ports of the fluid distributor 92 and into the sand bed B. The water flows through the sand bed B to form a filtrate F and then begins rising in the housing 12. Debris and large particulate material in the water are removed as the water filters through the sand bed B. At the same time that the water is being added, ozone generated in the ozone source 100 is supplied through the ozone conduit 98 to the ozone distribution cone 96 and into the interior of the housing 12 where the ozone contacts the filter media and the filtrate. The ozone percolates upwardly through the sand bed B and waste water. The ozone destroys microbes, bacteria, neutralizes organic material and oxidizes dissolved organic materials trapped in the sand bed B as well as in the water. Thus, the ozone not only disinfects the waste water being filtered but also disinfects the filter media as well.

Wet sand, water and debris form a slurry in the lower portion 16 of the housing 12, which flows downwardly under the influence of gravity and into the discharge conduit 70. Pressurized fluid, such as air, from the pressurized fluid source 82 is directed to the injector nozzles 78 and 80 in the transfer conduit 72 to form a fluidized bed at the bottom of the filtering device 10. The pressurized air forces the debris laden wet sand slurry in the discharge conduit 70 to flow through the transfer conduit 72 and into the separation chamber 56. The sand, along with debris having a density greater than that of the water being treated, move downwardly under the influence of gravity through the tapered bottom 60 and the separator conduit 62 into the replenishment conduit 36 where the sand and heavy debris are deposited onto the sand bed B. The lighter debris in the separation chamber 56 floats on top of the water which accumulates in the separation chamber 56. This lighter debris and water flows out of the separation chamber 56 into the waste conduit 64. The lighter debris and water can then be disposed of or, as described hereinbelow with respect to FIG. 3 of the drawings, can be directed to a secondary waste filtration system 104.

Thus, a bi-directional flow is created in the filtering device 10. The water being treated and the ozone move upwardly from the distributor unit 90 and rise toward the top of the housing 12 while the wet sand and trapped heavier debris flow downwardly under the influence of gravity. The filtrate F, i.e., water located above the upper level of the sand bed B which has flowed through the sand bed B and has been contacted with the ozone, is thus not only clarified but also disinfected. The level of the clarified and disinfected filtrate F above the sand bed B continues to rise until it reaches the level of the inlet end 48 of the filtrate conduit 46. The filtrate F flows into the inlet end 48, through the filtrate conduit 46 and then out of the filtering device 10 for use. The housing 12 and separator assembly 54 are configured such that an upper fluid level L of the filtrate F in the housing 12 is located above, preferably about one inch above an upper fluid level L' in the separator assembly 54.

As discussed above, the lighter debris in the separation chamber 56, along with organics and oils, float on top of the liquid in the separation chamber 56. In the second embodiment of the device 10 shown in FIG. 3 of the drawings, this debris laden liquid flows through the waste conduit 64 and into the cascading strainer 108. The liquid flows into the flow distributor 110, out of the holes 111 and is deposited on top of the separator screen 112. The liquid passes through the separator screen 112 and into the strainer discharge conduit 118. Preferably, a holding tank, not shown, is provided in flow communication with the strainer discharge conduit 118 and the cascading strainer 108, which permits remaining debris to settle out prior to the strained liquid flowing through the secondary filter 122. The separator screen 112 is preferably made of stainless steel with pore sizes in the range of about 100–2,000 microns. Debris which is larger than the pore size of the separator screen 112 moves downwardly along the top of the separator screen 112 and is deposited into the debris catcher 114 located adjacent the bottom of the separator screen 112. This debris can be then be removed, such as by being shoveled out of the debris catcher 114, and is then discarded.

The liquid from the cascading strainer 108 flows through the strainer discharge conduit 118 to the secondary filter 122, where materials are removed to a predetermined micron level. The filtered liquid then flows from the secondary filter 122 into the fluid inlet conduit 94 where it is mixed with incoming waste water and directed back into the filtering device 10. Thus, the filtering cycle of the filtering device 10 shown in FIG. 3 of the drawings is completed with substantially no discharge of liquid.

Due to the disinfecting action of the ozone, little or no organic or bacteriological build-up occurs in the filtering device 10. This significantly decreases the odor associated with prior art filtering devices and also increases the useful lifetime of a particular sand bed. Since the sand bed does not have to be replaced as frequently as in prior art devices, the present invention provides a more economic system for filtering waste liquid. However, when the sand bed eventually has to be changed, the system is shut down and the media removal conduit 22 is opened to remove the expended sand bed from the filtering device 10. When the old sand bed has been removed, the media removal conduit 22 is closed and new filter media is added through the filter media addition device 30, as described hereinabove.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting as to the scope of the invention which is to be given the full breadth of the appended claims and any and all equivalents thereof.

We claim:

1. A device for filtering and disinfecting fluid, comprising:
   a housing defining an interior adapted to hold a filter media in a first portion of said housing;
   a fluid inlet conduit in flow communication with the interior of the housing; and
   an ozone distributor in flow communication with the interior of the housing and positioned in the first portion of the housing so that the ozone distributor will be buried within a filter media.

2. A filtering device as claimed in claim 1, including a filter media addition device in flow communication with the interior of the housing.

3. A filtering device as claimed in claim 1, including a filtrate conduit having an inlet end and an outlet end, with the inlet end located in the interior of the housing and the outlet end located outside the housing.

4. A filtering device as claimed in claim 1, including a fluid distributor located in the interior of the housing in the first portion of the housing, with the fluid inlet conduit in flow communication with the fluid distributor.

5. A filtering device as claimed in claim 1, further comprising an ozone source in flow communication with the ozone distributor.

6. A filtering device as claimed in claim 1, wherein the first portion of the housing is in flow communication with a transfer conduit having an inlet end and an outlet end.

7. A filtering device as claimed in claim 1, including a separator assembly located in the interior of the housing, the separator assembly including a separation chamber having a separator discharge conduit.

8. A filtering device as claimed in claim 1, including a distributor unit located in the interior of the first portion of the housing, with the distributor unit including a fluid distributor in flow communication with the fluid inlet conduit and the ozone distributor in flow communication with an ozone source.

9. A filtering device as claimed in claim 2, wherein the filter media addition device includes a media replacement conduit having a discharge member in flow communication therewith.

10. A filtering device as claimed in claim 6, including at least one injection nozzle in flow communication with the transfer conduit, with the at least one injection nozzle adapted to be in flow communication with a pressurized fluid source.

11. A filtering device as claimed in claim 7, including a waste conduit extending from and in flow communication with the separation chamber.

12. A filtering device as claimed in claim 11, including a strainer assembly in flow communication with the waste conduit.

13. A filtering device as claimed in claim 12, wherein the strainer assembly includes a separator screen, with the waste conduit configured to direct liquid from the separation chamber onto the separator screen such that debris larger than a pore size of the separator screen is filtered out of the liquid.

14. A filtering device as claimed in claim 12, including a strainer discharge conduit extending between the strainer assembly and the waste fluid inlet conduit.

15. A filtering device as claimed in claim 1, further comprising filtering media positioned in the first portion of the housing, wherein the ozone distributor is in flow communication with at least a portion of the filtering media.

16. A filtering device as claimed in claim 15, wherein the filter media is sand.

17. A filtering device as claimed in claim 15, wherein the ozone distributor is buried within the filter media.

18. A method of filtering and disinfecting a fluid, comprising:

introducing filter media into a housing to form a filter bed;

directing the fluid to be filtered into the housing such that the fluid flows through the filter media to form a filtrate; and directing ozone into the housing through an ozone distributor positioned within the filter media such that the ozone contacts the filter media and the filtrate.

19. The method as claimed in claim 18, wherein the housing has a bottom, the method further comprising the step of directing filter media, fluid and debris from a portion of the housing through a transfer conduit to a separator assembly where filter media along with debris having a density greater than the fluid are reintroduced into the housing.

20. A method of filtering and disinfecting a fluid, comprising:

introducing filter media into a housing to form a filter bed, the housing having a bottom;

directing the fluid to be filtered into the housing such that the fluid flows through the filter media to form a filtrate;

directing ozone into the housing such that the ozone contacts the filter media and the filtrate; and directing filter media, fluid and debris from a portion of the housing through a transfer conduit to a separator assembly where filter media along with debris having a density greater than the fluid are reintroduced into the housing.

21. A device for filtering and disinfecting fluid, comprising:

a housing defining an interior adapted to hold a filter media in a first portion of said housing;

a fluid inlet conduit in flow communication with the interior of the housing;

an ozone distributor in flow communication with the interior of the housing and positioned in the first portion of the housing; and a separator assembly located in the interior of the housing, the separator assembly including a separation chamber having a separator discharge conduit.

* * * * *

UNITED STATES PATENT AND TRADEMARK OFFICE
CERTIFICATE OF CORRECTION

PATENT NO.   : 6,077,446
DATED        : June 20, 2000
INVENTOR(S)  : Carl A. Steiner et al.

It is certified that error appears in the above-identified patent and that said Letters Patent is hereby corrected as shown below:

Column 7,
Line 6, claim 11, "in claim 7" should read -- in claim 21 --.

Signed and Sealed this

Eighteenth Day of September, 2001

*Attest:*

*Attesting Officer*

NICHOLAS P. GODICI
*Acting Director of the United States Patent and Trademark Office*